Patented Aug. 9, 1938

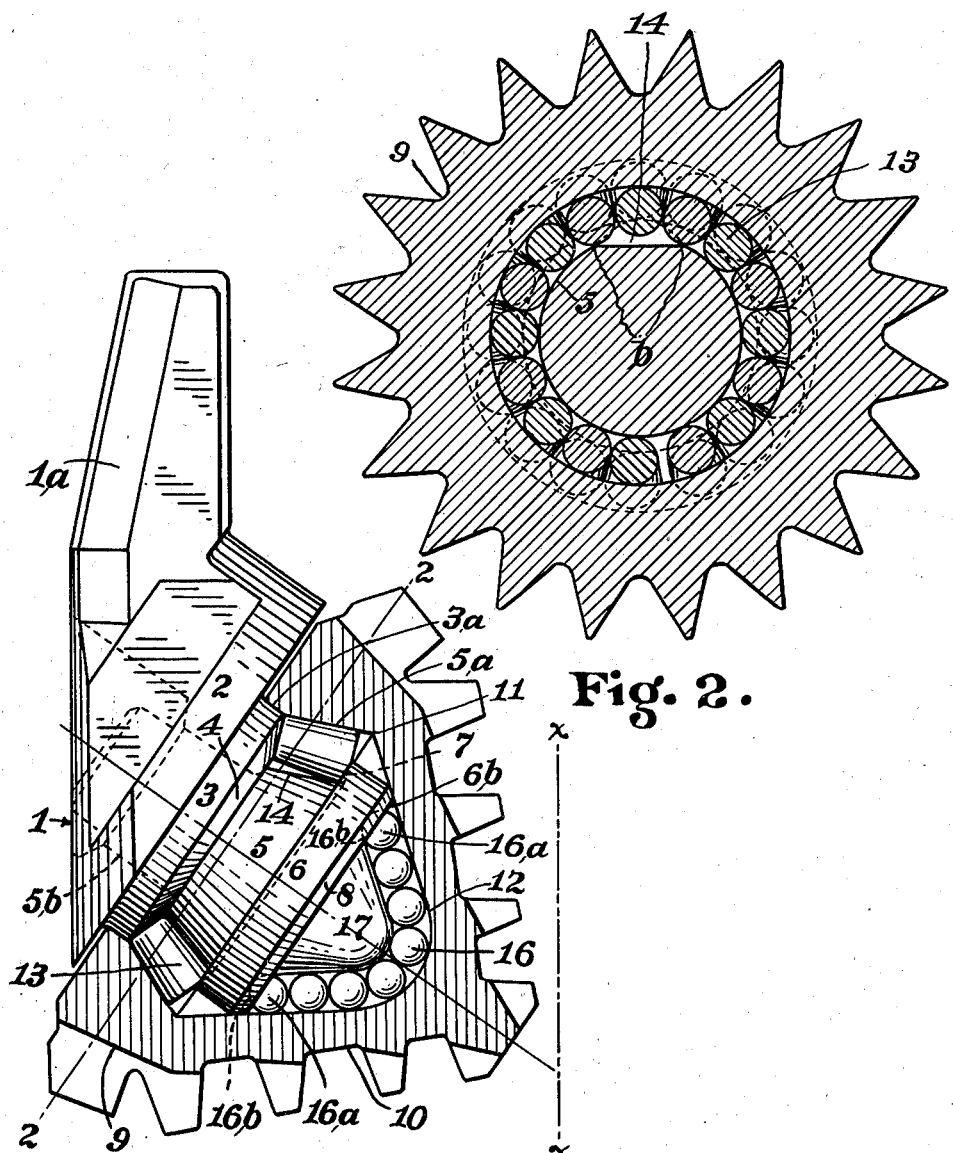

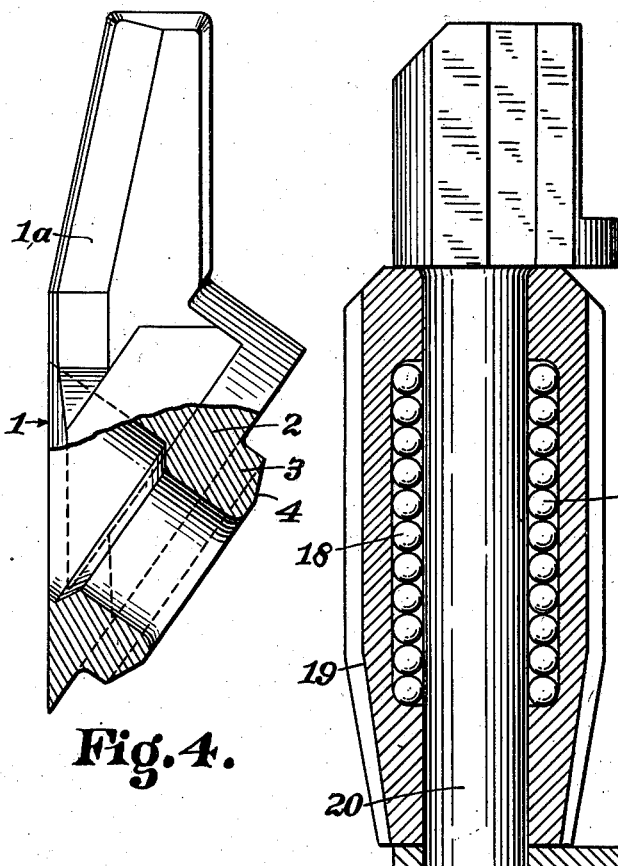
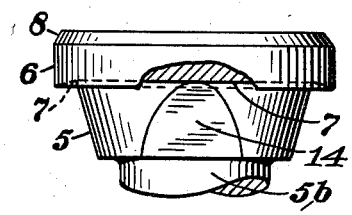
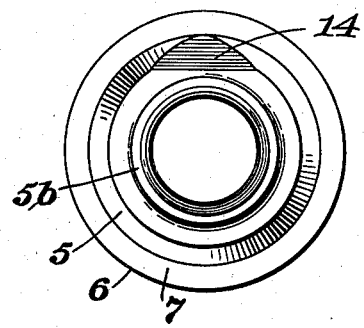
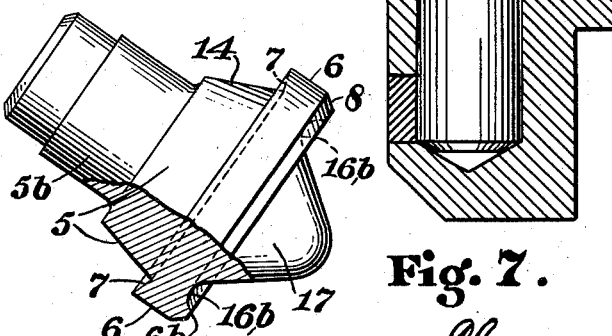

2,126,040

UNITED STATES PATENT OFFICE 2,126,040

ROLLER CUTTER ORGANIZATION FOR EARTH BORING DRILLS

Clarence E. Reed, Wichita, Kans., assignor to Chicago Pneumatic Tool Company, New York, N. Y., a corporation of New Jersey Application May 4, 1937, Serial No. 140,711
Renewed June 21, 1938

19 Claims. (Cl. 255—71)

An object of the invention is to provide a roller cutter, spindle, and anti-friction rolling bearing organization for earth boring drills, which will take care of thrust of the roller cutter occurring or predominating in a direction inwardly from the side of the hole being bored, towards the vertical axis of the drill.

Another object is to provide an organization which will permit the ready insertion of frusto-conical anti-friction rollers in a direction inwardly towards the vertical axis of the drill with the larger diameter ends of the said frusto-conical rollers foremost.

Another object is to provide a gateless passageway for the insertion of the frusto-conical anti-friction rollers, no special closure for filling said gateway being necessary.

Another object of the invention is to provide means in mass assembly for reducing friction between the roller cutter and the spindle.

Other objects of the invention will be clear from the description and accompanying drawings in which Figure 1 is a side view of the spindle and anti-friction bearings with the roller cutter in section.

Fig. 2 is a sectional view on the line 2—2 of Fig. 1.

Fig. 3 is a side view of the terminal member of the spindle partly in section.

Fig. 4 is a side view of the main spindle member and the shank thereof, a part of the said spindle member being shown in section.

Fig. 5 is a plan view of the terminal spindle member.

Fig. 6 is a view of the terminal section of the spindle looking in the direction of its axis at the smaller end face of the same.

Fig. 7 is a view of part of the invention in another form from that of Fig. 1.

In these drawings 1 indicates generally the main spindle section and 1a the shank thereof, which latter is adapted to be seated in any suitable way in connection with the drill head. This main spindle section comprises a body portion 2 having a cylindrical portion 3 which terminates in a frusto-conical portion 4 tapering towards the vertical axis of the drill which is indicated by the dotted line x—x. A separately formed terminal spindle section is connected with the main spindle section and includes a frusto-conical raceway surface 5, the larger diameter end of which is directed toward the vertical axis of the drill. The smaller diameter end of said raceway adjoins the smaller diameter end of the frusto-conical face 4 of the main spindle section.

This face 4, which is annular, provides the outer wall defining the frusto-conical raceway of which the surface 5 forms the bottom or bearing surface. The wall which defines the inner side of this frusto-conical raceway of the spindle is provided by the flange or portion 6 which is undercut at 7. This flange 6 is provided with a cylindrical face and a bevelled surface or edge 8 which faces the apex end of the organization. The frusto-conical roller cutter 9 is of the known type having a toothed base zone 9 and a frusto-conical apex zone 10, the former having wide teeth and the latter having widely spaced circumferential rows of teeth. The bore of this cutter has an annular cylindrical surface 3a within its open base portion adapted to frictionally bear on the surface 3 of the spindle, a frusto-conical raceway surface 5a complementary to the raceway surface 5 of the spindle and a frusto-conical portion tapering from the zone 11 to near the zone 12 where said surface merges into a curved surface at the extreme apex end of said bore.

Between the frusto-conical raceway surfaces 5 and 5a of the spindle and the roller cutter, frusto-conical anti-friction rollers 13 are located to run on said surfaces. These frusto-conical rollers have their large diameter ends directed towards the apex end of the organization, or in other words, towards the vertical axis of the drill. They take radial loads and also end thrust of the roller cutter in a direction from the side wall of the hole towards the vertical axis thereof. Such end thrusts predominate over thrusts taking place in an outward direction, when the roller cutter organization is used for reaming out or enlarging a hole, or for working in a tapered hole.

In order to permit insertion of the frusto-roller bearings 13 into the assembly with their larger diameter end portions directed towards the vertical axis of the drill, or in other words, towards the apex end of the assembly, despite the fact that the larger diameter end of said rollers 13 are foremost in the direction of movement, a passageway is formed in the frusto-conical raceway surface 5, as indicated at 14.

This passageway may be provided by making a flat surface on frusto-conical part 5. This flat surface may be in a plane at the upper side of the spindle between the points b in Fig. 2. This flat plane surface is inclined to the axis of the spindle at a degree corresponding to that of the raceway surface at 5a in Fig. 2 on the cutter, so that the large end of the roller bearing will find a space through which to move without hindrance.

The terminal section of the spindle shown in Fig. 3 is connected with the main section shown in Fig. 4 by a stem 5b preferably of cylindrical form fitting a corresponding bore in the main section indicated at 3b. The end of said stem is welded to the wall of the recess 3c in the body of the main spindle section.

In assembling the parts thus far described, the terminal spindle section is placed in the cutter into the relation shown in Fig. 1, in which position the bevelled face 8 would bear frictionally upon the bore wall of the cutter. The frusto-conical rollers are next inserted through the passageway 14, large diameter end first, and when in proper position their larger diameter end faces bear on the inclined shoulder 7 of the flange 6, formed by undercutting at this point. The edge of the large diameter end of the frusto-conical roller bearing engages the corner of the raceway where the frusto-conical surface 5 meets the face of the shoulder 7 so that said frusto-conical roller bearing finds support at this point when said roller bearing is crossing the said passageway 14, as well as at all other points around the spindle. At its smaller end face the frusto-conical roller finds a bearing on the frusto-conical face 4 of the main section of the spindle, and this contact of the small end face with the continuous or unbroken tapered face 4 of the main section of the spindle maintains the roller bearing in normal position against dropping down when said bearing is crossing the passageway 14. The frusto-conical rollers substantially fill the annular raceway space as shown in Fig. 2, between the spindle and the cutter, and as just stated find support at each end respectively by the walls or shoulder 4 and 7 on the spindle, and therefore in crossing over the passageway 14 said rollers will be maintained in their prescribed positions and will not tip or drop down. This passageway can be left open, no gate or closure member being necessary to fill it in to prevent displacement of the roller bearing against movement either in the direction of its axis or a tipping movement.

The bearing rollers do not have to cross any joint between an inserted gate or closure and the wall of the gateway which it closes, and the surfaces 4 and 7 with which the end faces of the roller bearing contact are intact and smooth throughout. Fig. 2 indicates that the roller bearings may be said to float or be held in suspension over the passageway 14 without contacting with the bottom thereof, and do not encounter any shoulder or edge projecting across their path. The width of the passage 14 is such that only one or two of such roller bearings are moving transversely over the passageway at one time. The flat surface of the passageway merges into the periphery of the raceway surface 5 at a low angle.

At 16 anti-friction balls are shown between a frusto-conical projection 17 at the inner end of the spindle, having a rounded end, and the wall of the bore within the apex of the roller cutter which wall is curved to be complementary to the rounded end of the said projection. These balls are in mass assembly in the sense that the space between the projection 17 and the bore wall of the apex portion of the cutter is filled with the balls, each bearing on an adjacent ball or balls and none of them having a raceway individual thereto and alone controlling the position or movement of any ball.

Certain of the balls, however, as at 16a find a bearing surface in the form of an annular groove at 16b in the face of a shoulder 6b of the flange 6, which shoulder annularly surrounds the base of the conical projection 17. This row of balls takes end thrust as well as upthrust of the cutter and this can be said of all the balls by reason of their contact with the tapered surfaces of the projection 17 and of the bore wall of the cutter within the apex portion thereof.

The friction bearings existing at 3a and 8 between the roller cutter and spindle are widely spaced apart.

It will be understood that before the terminal spindle section is inserted into the toothed roller cutter the balls 16 first must have been inserted into the apex bore of said cutter.

In Fig. 7 I show a mass of balls 18 between a reamer roller cutter 19 and a spindle 20. These balls may be inserted through one of the end openings in the roller cutter before the spindle is assembled therewith, said balls being held in the relative positions shown, one on top of another by heavy grease while the spindle is inserted. The balls like in the form above described hold each other in their prescribed position and are thus in mass assembly in contrast to an arrangement in which each ball or annular row of balls has a raceway individual thereto.

I claim:

1. A roller cutter assembly for earth boring drills comprising a toothed roller cutter of frusto-conical form having a bore opening through its base, a spindle having a frusto-conical raceway surface tapering in a direction away from the apex end of the roller cutter and having a passageway in said raceway surface, roller bearings tapered to fit the said raceway surface of the spindle and insertable into place between said spindle raceway surface and a complementary frusto-conical raceway surface of the roller cutter along said passageway with the larger diameter end first, and annular walls on the spindle contacting the end faces of said frusto-conical roller bearings and controlling the same to pass in normal position over said passageway, substantially as described.

2. A roller cutter assembly according to claim 1 in which one end of the said passageway coincides in radial distance from the axis of the spindle with the radius of the larger diameter end of the frusto-conical raceway surface of the spindle, and the bottom of said passage inclines thence at a steeper angle to the spindle axis than the said frusto-conical raceway surface and at an inclination substantially the same as that of the complementary frusto-conical raceway surface of the bore wall of the cutter, substantially as described.

3. In combination in a roller cutter assembly for earth boring apparatus, a spindle having a frusto-conical raceway surface, frusto-conical roller bearings on said surface, a roller cutter having a frusto-conical raceway surface for said roller bearings, the spindle raceway having a passageway for the insertion of the roller bearings, large end first, into position between the spindle and cutter, said passageway being at an inclination steeper towards the spindle axis than that of the inclination of the spindle raceway surface, the high end of said passageway coinciding in radial distance from the axis of the spindle with the radius of the larger end of said frusto-conical spindle raceway in order that the larger diameter end of the roller bearing will roll upon a continuous unbroken track.

4. In combination a spindle inclining downwardly and inwardly towards the vertical axis of the drill, a support for attaching the outer end of said spindle to a drill head, a frusto-conical cutter enclosing the spindle free end and having its apex portion directed to the vertical axis of the drill, a frusto-conical raceway surface on the spindle tapering outwardly towards the support and complementary to a frusto-conical raceway surface on the bore wall of the roller cutter, frusto-conical rollers between the raceways of the spindle and cutter tapering outwardly towards the spindle support, a wall on the spindle inclined to the axis thereof upon which the smaller end faces of the frusto-conical rollers bear, a second wall on the spindle also inclined to the spindle axis upon which the larger end faces of the frusto-conical rollers bear and a passageway for the insertion of the roller bearing in a direction towards the vertical axis of the drill, and with their larger ends first, said passageway inclining upwardly and inwardly to a point on the largest diameter zone of the spindles' frusto-conical raceway, substantially as described.

5. In combination in a roller cutter assembly for an earth boring drill, a frusto-conical roller cutter, a spindle inclining downwardly and inwardly towards the vertical axis of the drill having a main section and a terminal section removably connected with the main section, a support for the spindle connected to the outer end of the main section, said terminal section having a frusto-conical raceway surface tapering towards the support and terminating at the zone where it adjoins the main spindle section, frusto-conical rollers tapering outwardly towards the support and bearing on the frusto-conical raceway of the said terminal section, a passageway extending from the small end of said frusto-conical raceway surface and, at an inclination, to the larger diameter end of said raceway for the insertion of the frusto-conical rollers with their larger ends first in the direction of the vertical axis of the drill, the inner end of said passageway terminating at the surface of the larger diameter end of said raceway, said main spindle section having a portion against which the smaller diameter end faces of the frusto-conical rollers bear and said terminal section having a shoulder against which the larger diameter end faces of the frusto-conical rollers bear, said roller cutter having a frusto-conical raceway on which the said frusto-conical rollers run and means for securing the main and terminal spindle sections together, substantially as described.

6. In combination in a roller cutter assembly for earth boring drills, a frusto-conical toothed roller cutter, a spindle having a main and a terminal section with means connecting them together, said terminal section having a frusto-conical raceway surface tapering towards the main section of the spindle, a passageway in said raceway surface for the insertion of frusto-conical roller bearings, larger ends first, frusto-conical roller bearings adapted to be positioned through said passageway and means forming a part of the main spindle section to engage the smaller ends of said rollers for retaining them in place, said roller cutter having a raceway for said roller bearings, substantially as described.

7. A roller cutter assembly according to claim 6 in which the part on the main section of the spindle which engages the roller bearings consists of an annular surface inclined to the axis of the spindle, substantially as described.

8. As an article of manufacture, a spindle for a toothed roller cutter of an earth boring drill, having a frusto-conical raceway surface with a passageway extending from the smaller to the larger diameter ends of said surface, substantially as described.

9. An article according to claim 8 in which the bottom of said passageway at the larger diameter end of the frusto-conical surface is radially spaced from the axis of the spindle a distance equal to the radius of the larger end of the said frusto-conical surface, said passageway inclining towards the spindle axis to its greatest depth at the smaller diameter end of the said frusto-conical surface.

10. An article of maufacture according to claim 8 in which the bottom of the passageway is flat and merges at a low angle along its edges into the peripheral surface of said raceway.

11. An article of manufacture according to claim 8 in which the said passageway is substantially flat and every transverse line thereof is the chord of the arc of a circle described from the axis of the spindle at that point.

12. An article according to claim 8 in which said passageway is on the upper side of the spindle.

13. An article of manufacture comprising a spindle for a roller cutter of an earth boring drill comprising a main section having means at its outer end for attaching it to a drill head, a terminal section formed separate from the main section and attached coaxially thereto, said terminal section having a frusto-conical raceway tapering towards the main spindle section, and having a passageway in said conical surface extending from the smaller to the larger diameter end of said raceway for the insertion of roller bearings between said raceway surface and a complementary raceway on the roller cutter and annular surface, one on the main spindle section to be engaged by the smaller end face of said roller bearings the other on the terminal spindle section at the larger diameter end of said raceway surface to be engaged by the larger end faces of frusto-conical bearing rollers, said passageway inclining downwardly and inwardly in respect to said frusto-conical raceway from a point at the larger end of said raceway to the smaller diameter end thereof, substantially as described.

14. As an article of manufacture, a spindle for a roller cutter of earth boring drills having a main and a terminal section separately formed and connected together axially of each other end to end, a frusto-conical raceway portion on the terminal section tapering towards the main section, a passageway in said portion for the insertion of frusto-conical roller bearings with larger ends first, into position on said frusto-conical portion, and means on the main and terminal sections for engaging the end faces of said roller bearings to carry them in suspension over said passageway above the bottom thereof from the frusto-conical raceway portion at one edge, to the frusto-conical raceway portion at the other edge of said passageway.

15. As an article of manufacture, a spindle for a roller cutter of earth boring drills, comprising a main section having the shank for attachment to the drill head, a body portion having a cylindrical part for fitting in the base bore of a roller cutter, an annular frusto-conical face adjacent said cylindrical portion, a separately formed terminal spindle section having a frusto-conical raceway portion adjoining the frusto-conical annular surface of the main section, said terminal section having adjoining the larger diameter end of the frusto-conical raceway portion a flange with an undercut face on the side thereof adjacent the frusto-conical raceway portion, and having at its other side a frusto-conical projection with a rounded end, said frusto-conical raceway portion having a passageway extending from the smaller end of said portion to the larger end thereof, the end of said passageway at the larger end of said frusto-conical portion being at the same radial distance from the axis of the spindle as is the circumference of the larger end of said frusto-conical raceway portion.

16. A spindle for a roller cutter of an earth boring drill having a passageway for the insertion of roller bearings to a position between said spindle and a roller cutter, and walls engaging the end faces of the roller bearings to hold them in suspension to pass over said passageway.

17. In combination in a roller cutter organization for earth boring drills, a roller cutter of frusto-conical form having a toothed base area and a toothed apex area, a spindle having a free end enclosed by said frusto-conical roller cutter, said spindle having a frusto-conical raceway surface complementary to a frusto-conical raceway surface within the roller cutter, frusto-conical roller bearings between said raceway surface of the spindle and the cutter, a tapered projection at the free end of the spindle having a rounded end and a mass of anti-friction balls bearing upon said tapered projection and borne upon by the tapered bore wall of the cutter, which bore wall has a rounded portion within the apex of the cutter, forming a continuation of the tapered bore of said cutter, said curved wall being substantially concentric with the rounded end of the projection, said anti-friction balls taking upthrust and end thrust of the roller cutter, substantially as described.

18. In a roller cutter organization for earth boring drills, a toothed roller cutter, a spindle for said cutter, and a mass of anti-friction balls between the spindle and cutter, said balls bearing one upon another, and holding each other in place, the opposing surfaces of the spindle and cutter being smooth and continuous, and therefore devoid of defined raceways individual to the anti-friction balls, substantially as described.

19. In combination in an earth boring drill, a frusto-conical toothed roller cutter, a spindle enclosed thereby having a conical projection with a rounded end, and a mass of anti-friction balls between the said projection, and a complementary frusto-conical bore wall curved at its end within the apex of the said cutter, said balls taking upthrust and end thrust of said roller cutter, substantially as described.

CLARENCE E. REED.